United States Patent
Qing-An

(10) Patent No.: US 6,529,733 B1
(45) Date of Patent: Mar. 4, 2003

(54) METHOD OF HANDOFF CONTROL AND A HANDOFF CONTROL SYSTEM USING THEREOF

(75) Inventor: Zeng Qing-An, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/306,711

(22) Filed: May 7, 1999

(30) Foreign Application Priority Data

May 7, 1998 (JP) .......................................... 10-124849

(51) Int. Cl.$^7$ ................................................. H04Q 7/20
(52) U.S. Cl. ........................ 455/437; 455/440; 455/512; 455/513; 455/226.2; 370/332
(58) Field of Search ................................. 455/436, 437, 455/438, 440, 442, 509, 512, 513, 514; 370/331, 332, 333

(56) References Cited

U.S. PATENT DOCUMENTS

| | | | | |
|---|---|---|---|---|
| 5,301,356 A | * | 4/1994 | Bodin et al. ................ | 455/436 |
| 5,465,389 A | * | 11/1995 | Agrawal et al. ............ | 455/436 |
| 5,535,425 A | * | 7/1996 | Watanabe ................... | 455/436 |
| 6,167,267 A | * | 12/2000 | Djermester ................ | 455/434 |

FOREIGN PATENT DOCUMENTS

| | | |
|---|---|---|
| EP | 0 669 775 A2 | 8/1995 |
| JP | 7-240959 | 9/1995 |
| JP | 7-264656 | 10/1995 |

OTHER PUBLICATIONS

Yi–Bing Lin et al., "PCS Channel Assignment Strategies for Hand–off and Initial Access.", IEEE Personal Communications, vol. 1, No. 3, pp. 47–56, 1994.

D. Hong et al., "Traffic Model and Performance Analysis for Cellular Mobile Radio . . . Handoff Procedures", IEEE Trans. on Veh. Tech., vol. VT–35, No. 3, Aug. 1986, pp. 77–92.

Q. Zeng et al., "Performance Analysis of Mobile Cellular Radio System with Priority Reservation Handoff Procedures", IEEE Proc. VTC–94, vol. 3, Jun. 1994, pp. 1829–1833.

* cited by examiner

Primary Examiner—Edward F. Urban
Assistant Examiner—Temica M. Davis
(74) Attorney, Agent, or Firm—Foley & Lardner

(57) ABSTRACT

A handoff control system which can decrease the probability of forced termination of communication by considering the time allowed for handoff processing for each mobile terminal is provided. A handoff control system for performing a handoff processing for a mobile terminal, that moves across cells of a plurality of base stations while performing mobile communication, comprises the mobile terminal which periodically measures a reception signal intensity of a radio signal used for a current communication, calculates a relative change value of reception signal intensity at measurement time intervals, and periodically reports the measured reception signal intensity and the calculated relative change value of reception signal intensity; and the base station which periodically receives and stores the reception signal intensity and the relative change value of reception signal intensity respectively reported from the mobile terminal, and performs a handoff processing by giving a higher priority to a handoff request of a mobile terminal for which the stored relative change value of reception signal intensity is larger and the stored reception signal intensity is weaker.

6 Claims, 11 Drawing Sheets

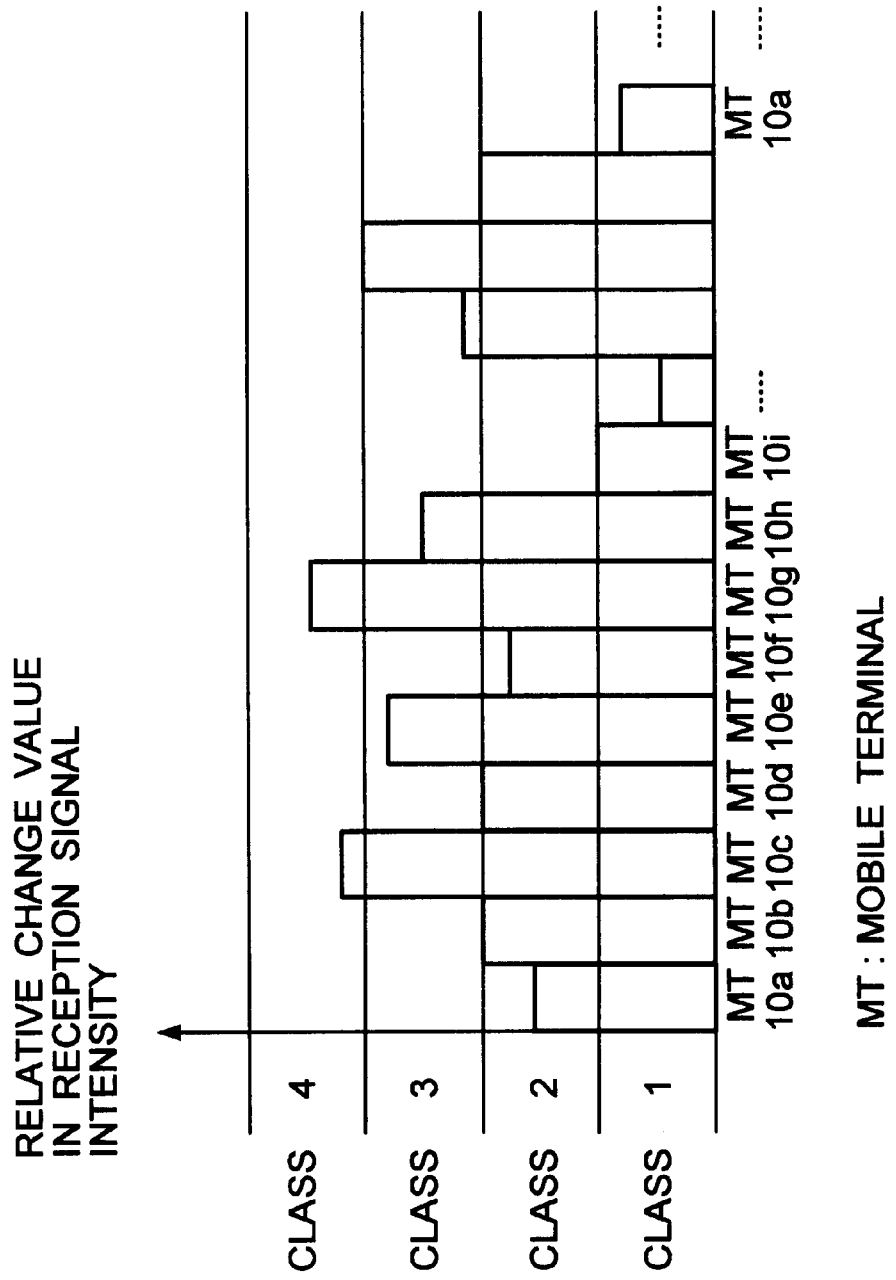

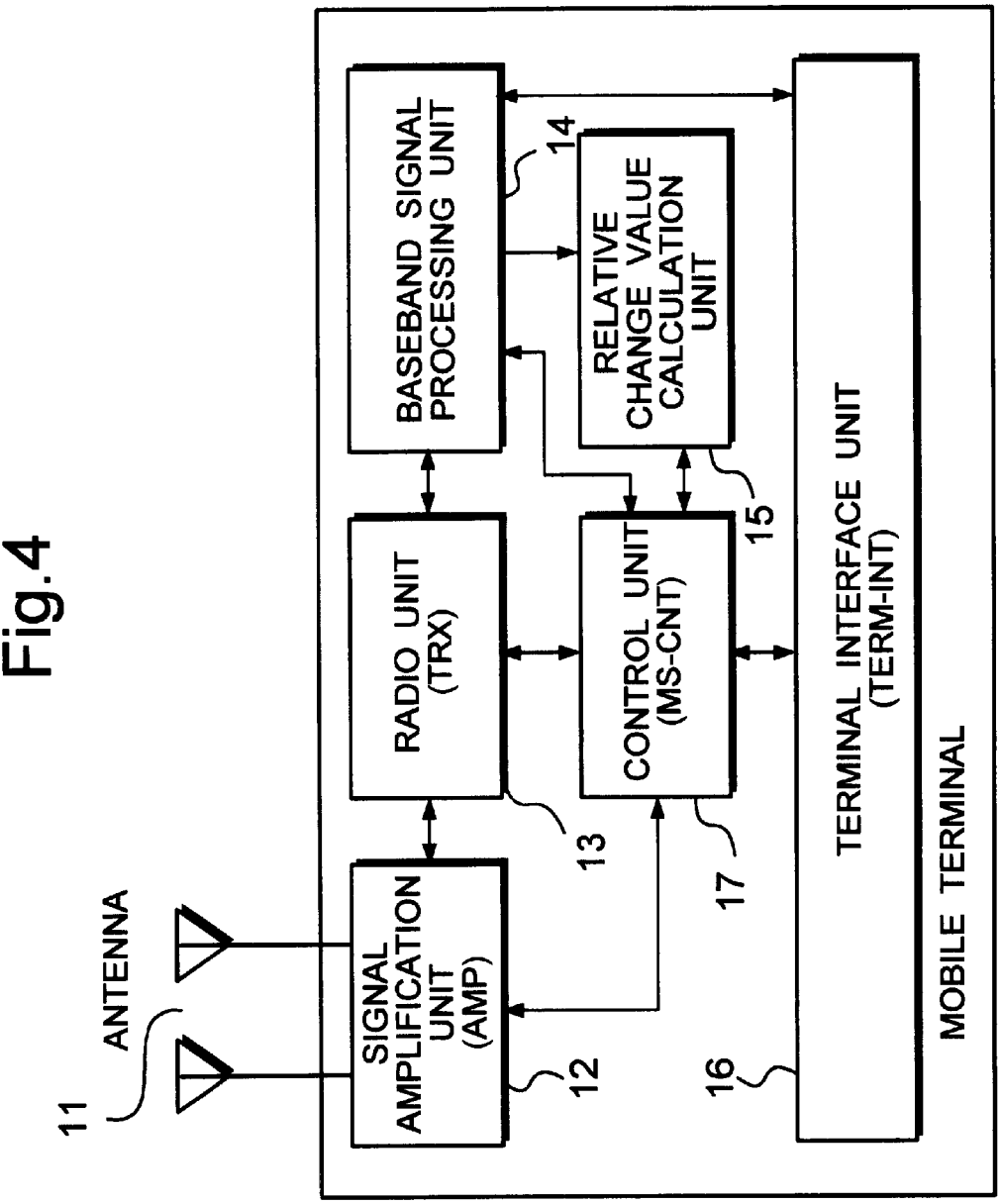

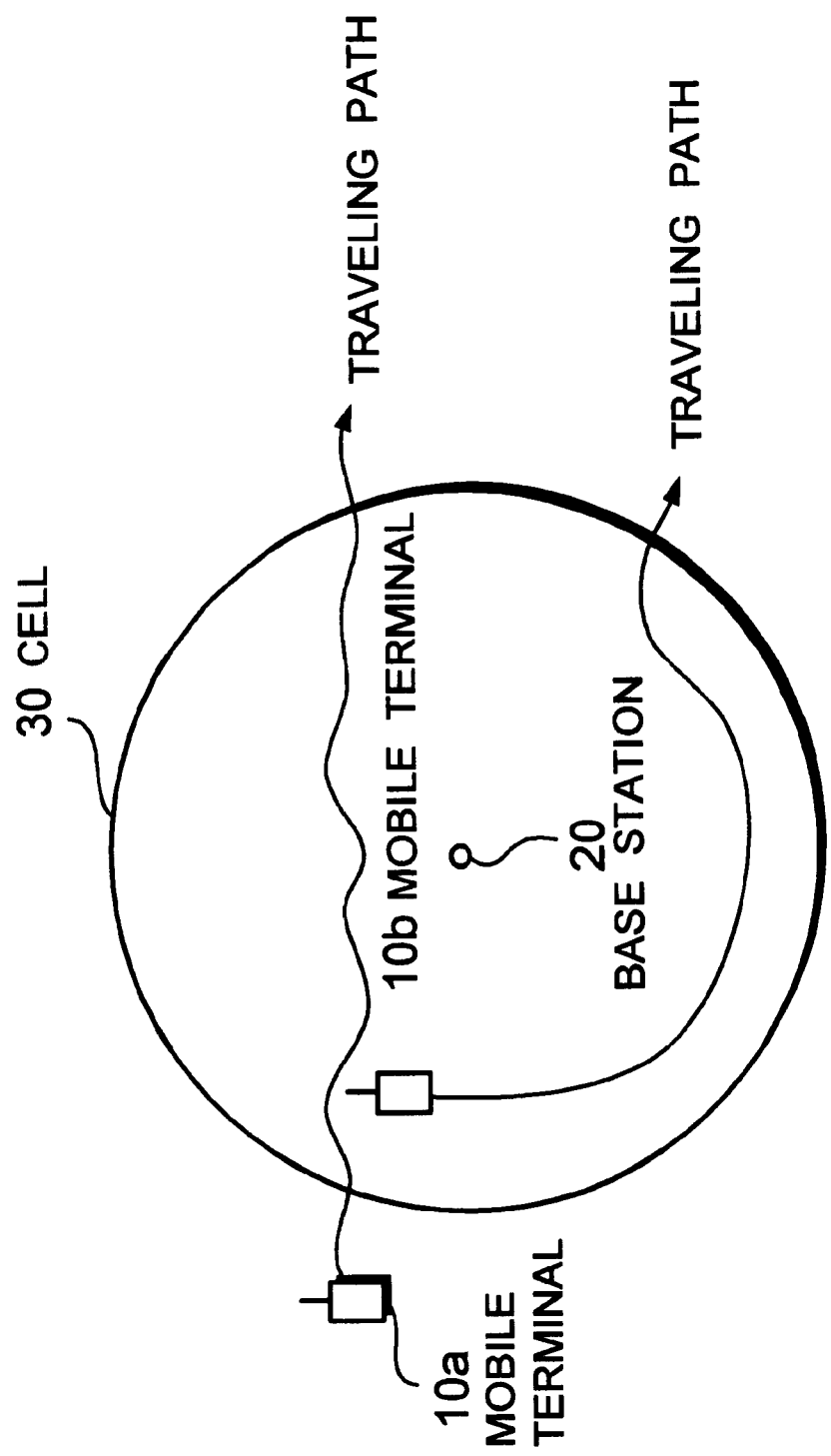

METHOD OF HANDOFF CONTROL AND A HANDOFF CONTROL SYSTEM USING THEREOF

BACKGROUND OF THE INVENTION

1. Field of the Invention

The present invention relates to a method of handoff control and a handoff control system in a cellular communication system and, more particularly, to a method of handoff control and a handoff control system which perform handoff processing by assigning a priority to each request for handoff from a mobile terminal.

2. Description of the Related Art

In recent years, the number of subscribers in mobile communication systems is unceasingly on the increase, and hence an increase in subscriber capacity is required. Reducing each cell radius in the cellular communication system is proposed as one of solutions for increasing the subscriber capacity. Reducing the cell radius means that a total number of base stations in the service area of the cellular communication system increases. As a consequence, the number of channels available for subscribers can be increased.

On the other hand, reducing the cell radius causes a mobile terminal to increase a chance of handoff operation. FIG. 11(A) is a schematic view for explaining a handoff operation in a general cellular communication system; and FIG. 11(B) is a view showing a case wherein the cell radius is reduced.

In FIG. 11(A), assume that the mobile terminal 110 is locating in the cell 130a of the base station 120a and is communicating with the base station 120a, and the mobile terminal 110 is moving into the cell 130b of the base station 120b. As the mobile terminal 110 is moving away from the base station 120a, the reception signal intensity from the base station 120a gradually decreases at the mobile terminal 110. In this case, the reception signal intensity indicates the magnitude of signal power received from the base station.

The reception signal intensity from the base station 120a is periodically measured by the mobile terminal 110. When the measured reception signal intensity becomes equal to or less than a predetermined threshold level, the mobile terminal 110 sends a handoff request to the base station 120a for continuing the present communication of a call by changing the base station from the base station 120a to the base station 120b. With this operation, the mobile terminal 110 is set in a state in which it can also receive service from the base station 120b.

The handoff request sent from the mobile terminal 110 to the base station 120a is notified from the base station 120a to the base station 120b through a network apparatus such as a base station control or mobile switching center equipment (not shown). Thereafter, the mobile terminal 110 can communicate with both the base stations 120a and 120b. When the mobile terminal 110 is further moving away from the base station 120a, the communication with the base station 120a is disconnected, and the mobile terminal 110 only communicate with the base station 120b.

An area where the mobile terminal 110 can communicate with both the base stations 120a and 102b is an overlap area 140 where the cells 130a and 130b overlap.

When the cell radius is reduced as shown in FIG. 11(B), the above handoff operation is frequently performed. For this reason, as the cell radius decreases, the handoff traffic increases, and forced termination of communication tends to occur due to lack of communication channels.

A method of avoiding such a situation by preparing a queue for handoff requests by each of mobile terminals is disclosed in, for example, D. Hong et al., "Traffic model and performance analysis for cellular mobile radio telephone systems with prioritized and nonprioritized handoff procedures", IEEE Trans. Veh. Technol., vol. VT-35, August 1986 (reference 1) and Q. A. Zeng et al., "Performance analysis of mobile cellular radio system with priority reservation handoff procedures", IEEE Proc. VTC-94, vol. 3, June 1994 (reference 2).

According to reference 1, of all the set channels, some number of channels are always reserved as handoff channels, and the dedicated handoff channels are only used for the handoff operation, and not used for ordinary new calls. With this arrangement, the call loss probability during handoff operation due to lack of communication channels is reduced. According to reference 2, a buffer for new calls is provided in addition to the technique disclosed in reference 1 to decrease the call loss probability for new calls without increasing the blocking probability and probability of forced termination of handoff calls much.

In addition, Japanese Patent Laid-Open No. 7-264656 (reference 3) discloses a technique of assigning priority to each handoff process on the basis of a calculation result considering the moving speed and direction of each mobile terminal, and performing the handoff processes in accordance with the priority.

Each mobile terminal is moving across cells at various speeds. For example, the moving speed of a mobile terminal that is moving on a car differs from that of a mobile terminal carried by a walking user. As the moving speed of each mobile terminal differs in this manner, the time allowed between the instant at which a handoff request is generated and the instant at which the handoff process is completed changes. When handoff processes are performed only in the order of accepting handoff requests, forced termination of communication may occur at a certain mobile terminal that is moving at a high speed if between the instant at which a handoff request is generated and the instant at which the handoff process is completed is prolonged.

In addition, a mobile terminal that moves at a high speed generates handoff requests many times during one communication because it passes many cells in a predetermined period of time, and hence the probability of forced termination of communication tends to increase. Furthermore, mobile terminals move across cells through various routes; some mobile terminals move away from the base station from which service is provided, and some mobile terminals move while keeping distances to the base station constant.

When mobile terminals move through different routes as described above, the time allowed between the instant at which a handoff request is generated and the instant at which the handoff process is completed changes as well. When handoff processes are simply performed in the order of handoff requests, a delay in performing a handoff process may cause forced termination of communication at a mobile terminal which moves away rapidly from the base station currently under communication.

In the technique disclosed in reference 3, since complicated arithmetic operation is required to assign priorities, and a priority is assigned to each call, processing for a handoff request is frequently performed and complicated.

SUMMARY OF THE INVENTION

It is an object of the present invention to provide a handoff control system and method which can decrease the probability of forced termination of communication by considering the time allowed between the instant at which a handoff request is generated and the instant at which the handoff process is completed.

In order to achieve the above object, according to the present invention, a handoff control system for performing a handoff processing for a mobile terminal, that moves across cells of a plurality of base stations while performing mobile communication, comprises the following mobile terminal and a base station.

A mobile terminal which periodically measures a reception signal intensity of a radio signal used for a current communication, calculates a relative change value of reception signal intensity at measurement time intervals, and periodically reports the measured reception signal intensity and the calculated relative change value of reception signal intensity; and a base station which periodically receives and stores the reception signal intensity and the relative change value of reception signal intensity respectively reported from the mobile terminal, and performs a handoff processing by giving a higher priority to a handoff request of a mobile terminal for which the stored relative change value of reception signal intensity is larger and the stored reception signal intensity is weaker.

In more detail, the mobile terminal comprises a reception signal measuring section which periodically measures a reception signal intensity of a radio signal used for a current communication, a relative change value calculating section which calculates a relative change value of reception signal intensity output from the reception signal measuring section at measurement time intervals, and a control section which reports the measured reception signal intensity and the calculated relative change value of reception signal intensity periodically to the base station under communicating, and outputs a handoff request when the measured reception signal intensity has reached a predetermined handoff threshold level. Also, the base station comprises a memory table which stores data of the reception signal intensity and the relative change value of reception signal intensity in association with each mobile terminal, and renews data in accordance with each periodical report, a plurality of queues to which priories based on relative change values of reception signal intensity are assigned in advance, a handoff request processing section which distributes a handoff request from each mobile terminal to one of the queues on the basis of the relative change value of reception signal intensity corresponding to the mobile terminal stored in the memory table, a queue sequence determination section which determines handoff processing orders for a plurality of handoff requests distributed in the same queue with giving a higher priority to a handoff request for which corresponding reception signal intensity stored in the memory table is weaker, and a queue control section which performs a handoff processing for a handoff request having a higher processing order waiting in the queue having a higher priority.

In the present invention, the relative change value calculating section can be equipped in the base station instead of equipped in the mobile terminal. In this case, the mobile terminal can only report the reception signal intensity to the base station, and the relative change value calculating section in the base station calculates the relative change value of the reception signal intensity by using periodically reported reception signal intensity from the mobile terminal.

According to the present invention, a method of handoff control for performing a handoff processing for a mobile terminal, that moves across cells of a plurality of base stations while performing mobile communication, comprises the following elements:

measuring a reception signal intensity of a radio signal used for a current communication periodically at said mobile terminal;

calculating, at the mobile terminal, a relative change value of reception signal intensity by the measured reception signal intensity at measurement time intervals;

reporting the measured reception signal intensity and the calculated relative change value of reception signal intensity periodically from the mobile terminal to the base station under communicating;

receiving and storing, at the base station, the reception signal intensity and the relative change value of reception signal intensity respectively reported from the mobile terminal;

sending a handoff request by the mobile terminal when the measured reception signal intensity has reached a predetermined handoff threshold level; and performing a handoff processing at the base station by giving a higher priority to a handoff request of a mobile terminal for which the stored relative change value of reception signal intensity is larger and the stored reception signal intensity is weaker.

Also in this method invention, the calculation of the relative change value of reception signal intensity can be performed in the base station instead of performed in the mobile terminal. That is, the mobile terminal only reports the measured reception signal intensity periodically to the base station under communicating, and in the base station, it receives the reception signal intensity, calculates a relative change value of reception signal intensity by the reception signal intensity at reporting time intervals, and stores the reception signal intensity and the relative change value of reception signal intensity respectively in association with the mobile terminal.

The element of performing a handoff processing at the base station further comprises the following elements:

distributing a handoff request from each mobile terminal to one of plurality of queues provided in the base station, to which priories based on relative change values of reception signal intensity are assigned in advance, on the basis of the relative change value of reception signal intensity corresponding to the mobile terminal stored in the memory table:

determining handoff processing orders for a plurality of handoff requests distributed in the same queue with giving a higher priority to a handoff request for which corresponding reception signal intensity stored in the memory table is weaker: and performing a handoff processing for a handoff request having a higher processing order waiting in the queue having a higher priority.

BRIEF DESCRIPTION OF THE DRAWINGS

FIG. 3 is a graph for explaining a method of determining the priority order of handoff process for each mobile terminal in the handoff control system according to the present invention;

FIG. 4 is a block diagram showing a mobile terminal of the handoff control system according to the present invention;

FIG. 10 is a view for explaining control based on the moving routes of mobile terminals in the handoff control system according to the present invention;

DETAILED DESCRIPTION OF THE PREFERRED EMBODIMENTS

The present invention will be described in detail below with reference to the accompanying drawings.

Figure 1:
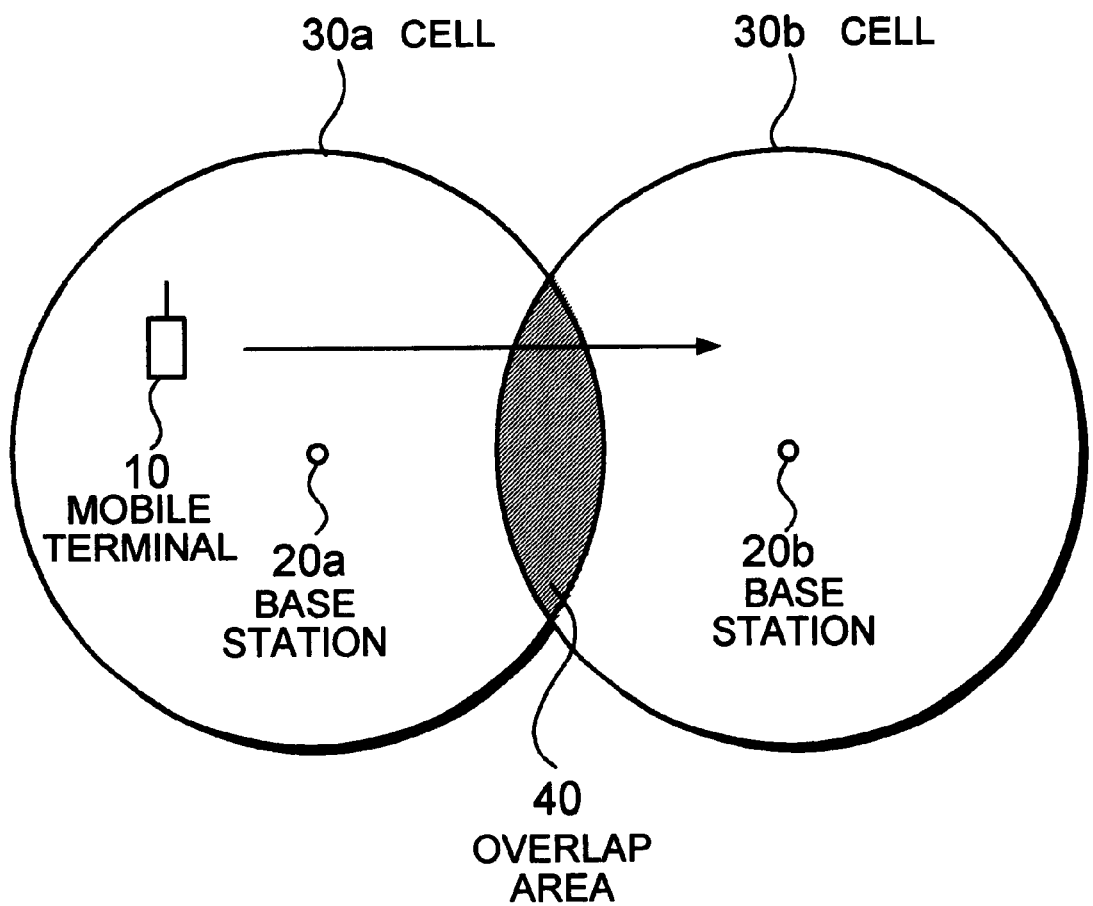
FIG. 1 is a schematic view for explaining a handoff control system according to an embodiment of the present invention.

FIG. 1 schematically shows a handoff control system according to an embodiment of the present invention.

Referring to FIG. 1, a mobile terminal 10 located in a cell 30a of a base station 20a is moving toward a cell 30b of a base station 20b adjacent to the base station 20a while receiving service from the base station 20a. At this time, the mobile terminal 10 periodically measures the reception signal intensity from the base station 20a, and the measured reception signal intensity and the relative change value of reception signal intensity are notified to the base station 20a at measurement time intervals. In addition, the measured reception signal intensity and the relative change value of reception signal intensity measured at the mobile terminal 10 are also notified from the base station 20a to the base station 20b adjacent to the base station 20a through a network (e.g. a base station control apparatus which is not shown).

In the base stations 20a and 20b, the measured reception signal intensity and the relative change value of reception signal intensity notified from the mobile terminal 10 are stored, and queues to which priorities are assigned on the basis of the relative change values of reception signal intensity are provided in advance. When a handoff request is sent from the mobile terminal 10, the handoff request corresponding to the mobile terminal 10 is distributed to the queue depending on the relative change value of reception signal intensity notified from the mobile terminal 10, and also a waiting order in the queue is determined based on the measured reception signal intensity notified by the mobile terminal 10. Thereafter, handoff control is performed on the basis of the priority order.

A method of calculating the relative change value of reception signal intensity and a method of determining the priority order will be described next with reference to FIGS. 2(A) and 2(B).

Figure 2A:
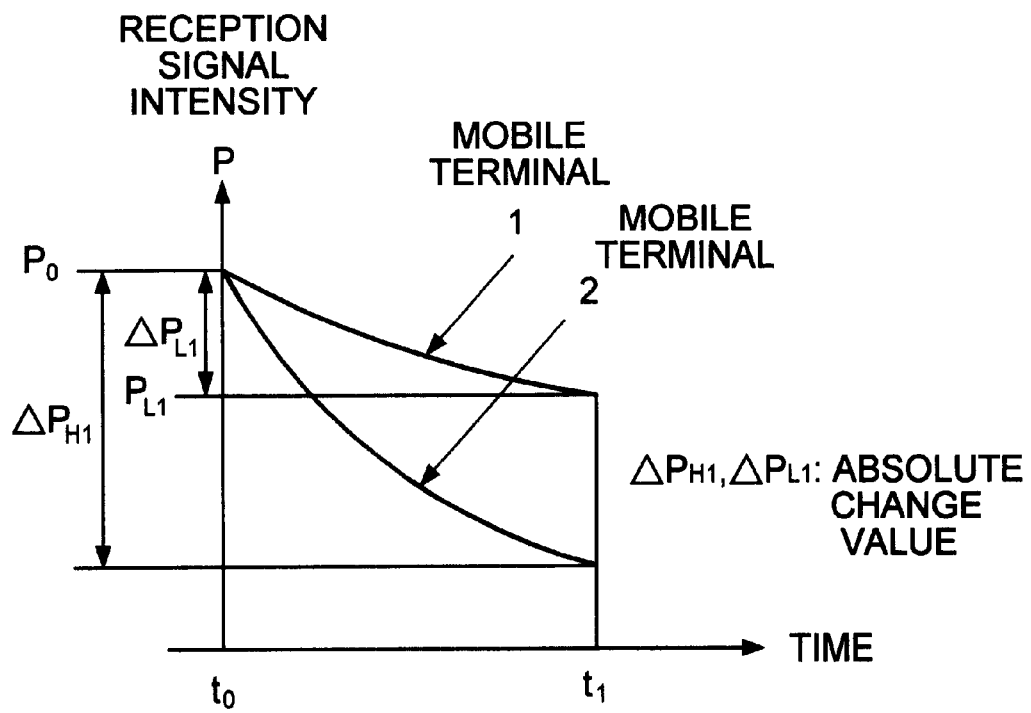
FIG. 2(A) is a graph for explaining a method of calculating change values of reception signal intensities when two mobile terminals move from positions where they have the same reception signal intensity.
Figure 2B:
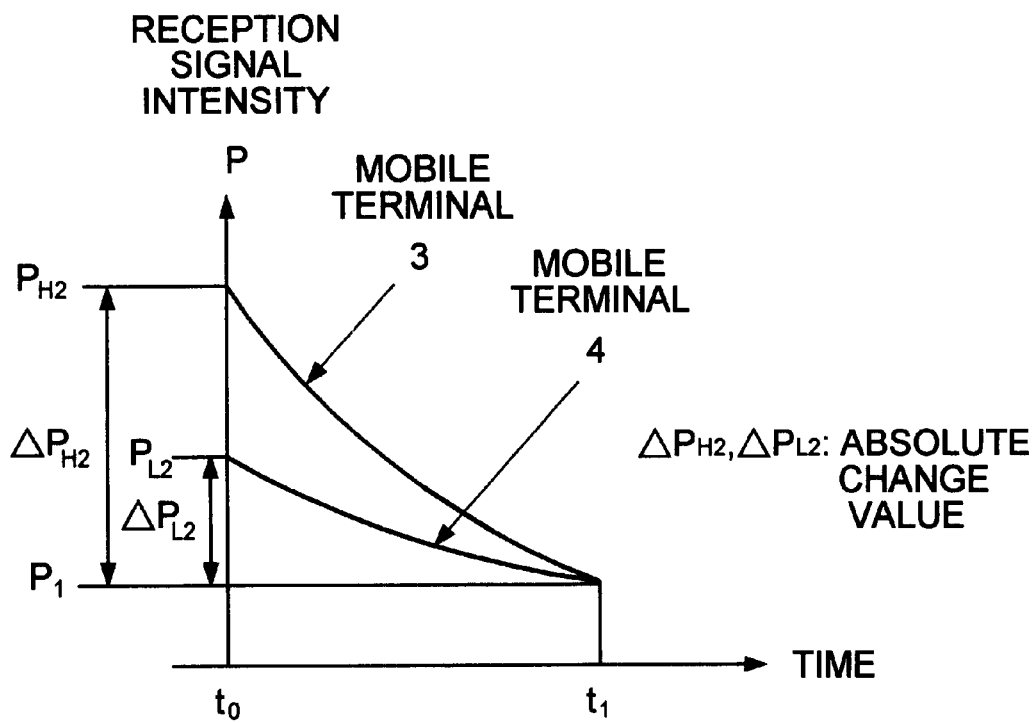
FIG. 2(B) is a graph for explaining a method of calculating change values of reception signal intensities when two mobile terminals move from positions where they have different reception signal intensities to positions where the reception signal intensities become equal.

FIGS. 2(A) and 2(B) include graphs for explaining a method of calculating the reception signal intensity in a handoff control system as shown in FIG. 1. Wherein, FIG. 2(A) is a graph for explaining the case where two mobile terminals have moved from the locations which give the same reception signal intensity, whereas FIG. 2(B) is a graph for explaining the case where two mobile terminals have moved from the locations which give different reception signal intensity to other locations which give the same reception signal intensity of the value identical to the handoff threshold level. It is noted that FIGS. 2(A) and 2(B) shows time along an axis of abscissas vs. reception signal intensity along an axis of ordinates.

Referring to FIG. 2(A), assume that a mobile terminal measuring a reception signal intensity P0 at time t0 moves to a different location at which measuring a reception signal intensity PL1 at time t1. In this case, the relative change value of the reception signal intensity is defined as:

$$(PL1-P0)/(PL1+P0)$$

Also assume that a mobile terminal measuring the reception signal intensity P0 at time t0 moves to a location at which measuring a reception signal intensity PH1 at time t1. In this case, the relative change value of the reception signal intensity is defined as:

$$(PH1-P0)/(PH1+P0)$$

The absolute change value of reception signal intensity at the mobile terminal measuring the reception signal intensity PL1 at time t1 is represented by Δ (delta)PL1. The absolute change value of reception signal intensity at the mobile terminal measuring the reception signal intensity PH1 at time t1 is represented by Δ (delta)PH1. An absolute change value Δ (delta) PH1 of reception signal intensity at the mobile terminal measuring the reception signal intensity PH1 at time t1 is larger than the absolute change value Δ (delta) PL1 of reception signal intensity at the mobile terminal measuring the reception signal intensity PL1 at time t1. That is, the mobile terminal measuring the reception signal intensity PH1 at time t1 moves away from the base station at a higher speed than the mobile terminal measuring the reception signal intensity PL1 at time t1.

When the mobile terminal measuring the reception signal intensity P0 at time t0 moves to a location at which measuring the reception signal intensity PL1 at time t1, the above relative change value can be defined as:

$$(PL1-P0)/PL1$$

or $$(PL1-P0)/P0$$

When the mobile terminal measuring the reception signal intensity P0 at time t0 moves to a location at which measuring the reception signal intensity PH1 at time t1, the above relative change value can be defined as:

$$(PH1-P0)/PH1$$

or $$(PH1-P0)/P0$$

Referring to FIG. 2(B), assume that a mobile terminal measuring a reception signal intensity PL2 at time t0 moves to a location at which measuring a reception signal intensity P1 at time t1. In this case, the relative change value is defined as:

$$(P1-PL2)/(t1-t0)$$

Assume that a mobile terminal measuring a reception signal intensity PH2 at time t0 moves to a location at which measuring a reception signal intensity P1 at time t1. In this case, the relative change value is defined as:

$$(P1-PH2)/(t1-t0)$$

The absolute change value of reception signal intensity at the mobile terminal measuring the reception signal intensity PL2 at time t0 is represented by $\Delta$ (delta)PL2. The absolute change value of reception signal intensity at the mobile terminal measuring the reception signal intensity PH2 at time ti is represented by $\Delta$ (delta)PH2. An absolute change value $\Delta$ (delta) PH2 of reception electric field signal intensity at the mobile terminal measuring the reception signal intensity PH2 at time t0 is larger than the absolute change value $\Delta$ (delta) PL2 of reception electric field signal intensity at the mobile terminal measuring the reception signal intensity PL2 at time t0. That is, the mobile terminal measuring the reception signal intensity PH2 at time t0 moves away from the base station at a higher speed than the mobile terminal measuring the reception signal intensity PL2 at time t0.

FIG. 3 explains the method of determining the priority order of handoff processes at mobile terminals in the handoff control system according to the present invention.

As shown in FIG. 3, the priority assigned to a mobile terminal, which is requesting the handoff processing, is determined on the basis of the magnitude of the relative change value of reception signal intensity at the mobile terminal. The relative change values of reception signal intensity are classified into four classes depending on the magnitudes. The priority assigned to each mobile terminal is determined depending on which class the relative change value of reception signal intensity at the mobile terminal belongs. For example, a mobile terminal 10a belongs to class 2; a mobile terminal 10b, class 3; and a mobile terminal 10c, class 4. The highest priority is assigned to class 4, and the lowest priority is assigned to class 1.

The arrangements of a mobile terminal and base station of the handoff control system according to the present invention will be described next with reference to FIGS. 4 and 5.

Figure 5:
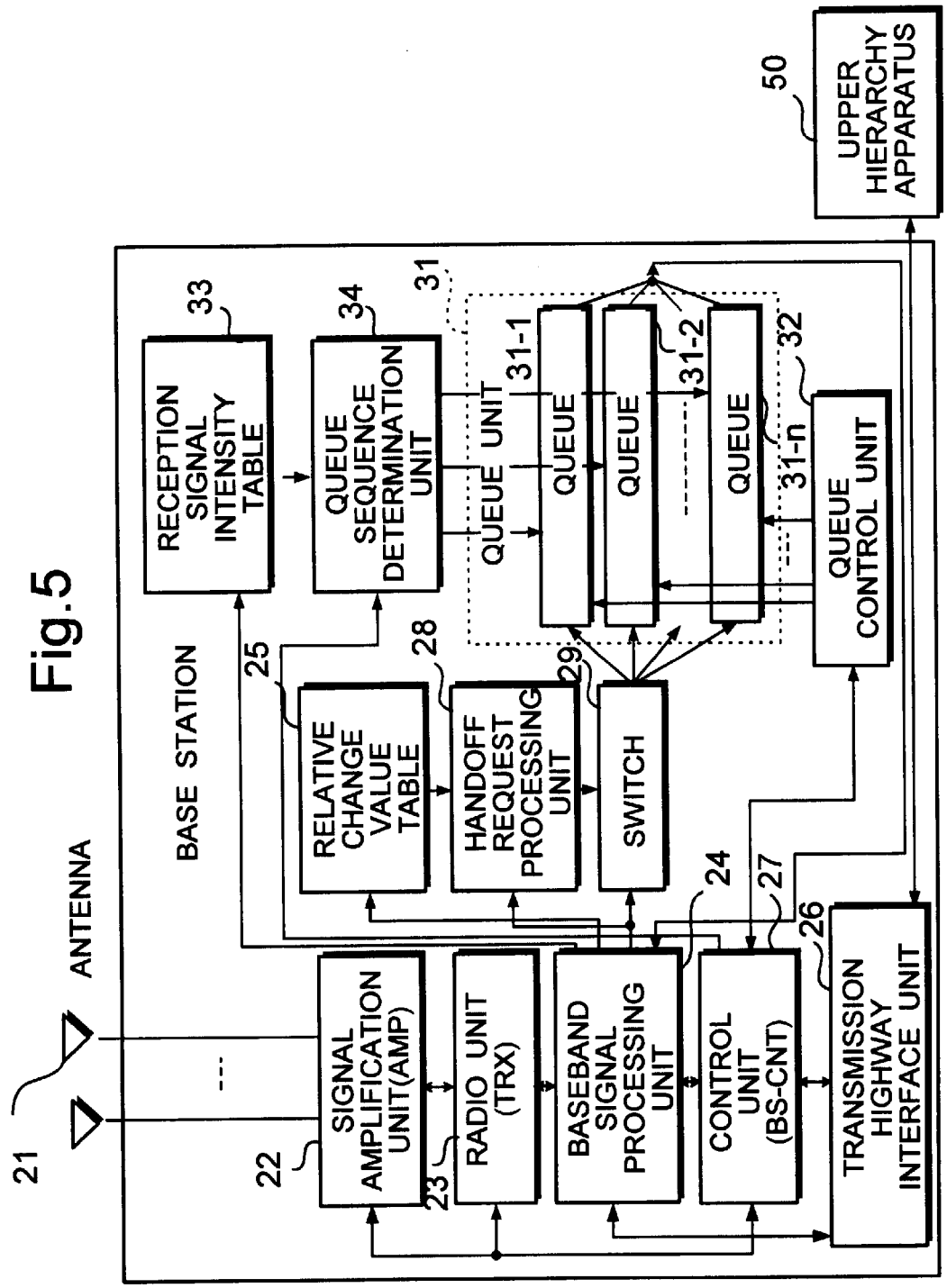
FIG. 5 is a block diagram showing a base station of the handoff control system according to the present invention.

FIGS. 4 and 5 show a block diagram of a mobile terminal and a block diagram of a base station respectively according to the present invention;

As shown in FIG. 4, the mobile terminal 10 is comprised of a pair of antenna sections 11 for receiving and transmitting radio waves, a signal amplification unit (AMP) 12 connected to the antenna sections 11, a radio unit (TRX) 13 connected to the signal amplification unit (AMP) 12, a baseband signal processing unit 14 connected to the radio unit (TRX) 13, a relative change value calculation unit 15 connected to the baseband signal processing unit 14, a terminal interface unit (TERM-INT) 16 connected to the baseband signal processing unit 14, and a control unit (MS-CNT) 17.

The signal amplification unit (AMP) 12 amplifies the reception RF (Radio Frequency) signal received through the antenna section 11 and the transmission RF signal to be transmitted through the antenna section 11, and multiplexes the transmission RF signals and de-multiplexes the reception RF signals.

The radio unit (TRX) 13 performs quasi-synchronous detection of the reception RF signal amplified by the signal amplification unit 12 and converts it into a digital signal. In addition, the radio unit 13 first converts the transmission signal to be transmitted through the antenna section 11 into an analog signal, and then converts the signal into a transmission RF signal by quadrature modulation.

The baseband signal processing unit 14 performs demodulation, synchronization, and error correction decoding of the reception signal converted into the digital signal by the radio unit 13, multiplexing and de-multiplexing of data, error correction encoding and framing of the transmission signal to be transmitted through the antenna section 11, and baseband signal processing such as data modulation. The baseband signal processing unit 14 also includes a measuring part (not shown) for periodically measuring the intensity of a reception signal from the base station 20a.

The relative change value calculation unit 15 calculates the relative change value of reception signal intensity measured by the baseband processing unit 14 at measurement time intervals.

The terminal interface unit (TERM-INT) 16 has voice CODEC (coder and decoder) and data adapter functions and interfaces with an externally connected handset or external data terminal (not shown).

The control unit (MS-CNT) 17 performs transmission and reception control of control signals, and controls the signal amplification unit 12, the radio unit 13, the baseband processing unit 14, the relative change value calculation unit 15, and the terminal interface unit 16.

When the mobile terminal 10 having this arrangement is to transmit a signal to the base station 20a, the signal input through the terminal interface unit 16 is subjected to baseband signal processing in the baseband processing unit 14. Thereafter, the baseband signal output from the baseband processing unit 14 is converted into an analog signal by the radio unit 13. The analog signal output from the radio unit 13 is amplified by the signal amplification unit 12. The amplified signal is transmitted to the base station 20a through the antenna section 11.

When the signal transmitted from the base station 20a is to be received, the signal received through the antenna section 11 is amplified by the signal amplification unit 12. The amplified signal is converted into a digital signal by the radio unit 13 upon quasi-synchronous detection. The digital signal output from the radio unit 13 is subjected to baseband processing in the baseband processing unit 14 and output through the terminal interface unit 16.

The measuring part (not shown) of the baseband processing unit 14 periodically measures the reception signal intensity from the base station 20a. The relative change calculation unit 15 calculates the relative change value of intensity of the reception signal output from the baseband processing unit 14 for every measuring time.

The reception signal intensity measured by the baseband processing unit 14 and the relative change value of reception signal intensity calculated by the relative change calculation unit 15 are simultaneously notified to the base station 20a in a predetermined cycle.

Next, the explanation will be given for the base station 20a with referring to FIG. 5.

As shown in FIG. 5, each of the base stations 20a and 20b is comprised of a pair of antenna sections 21 for receiving and transmitting radio waves, a signal amplification unit (AMP) 22 connected to the antenna section 21, a radio unit (TRX) 23 connected to the signal amplification unit (AMP) 22, a baseband signal processing unit 24 connected to the radio unit (TRX) 23, a relative change value table 25 connected to the baseband signal processing unit 24, a transmission highway interface unit 26 for interfacing with an upper hierarchy apparatus 50, a queue unit 31 connected to the baseband signal processing unit 24, a handoff request processing unit 28 connected to the baseband signal processing unit 24 and the relative change value table 25, a switch 29 connected to the baseband signal processing unit 24, the handoff request processing unit 28 and the queue unit 31, a queue control unit 32 connected to the queue unit 31, a reception signal intensity table 33 connected to the baseband signal processing unit 24, a queue sequence determination unit 34 connected to the reception signal intensity table 33 and the queue unit 31, and a control unit 27.

The signal amplification unit (AMP) 22 amplifies the reception RF signal received through the antenna section 21 and the transmission RF signal to be transmitted through the antenna section 21, and multiplexes the transmission RF signals and de-multiplexes the reception RF signals.

The radio unit (TRX) 23 performs quasi-synchronous detection of the reception RF signal amplified by the signal amplification unit (AMP) 22, and converts the signal into a digital signal. The radio unit (TRX) 23 also converts the signal to be transmitted through the antenna section 21 into an analog signal, and converts it into a transmission RF signal by quadrature modulation.

The baseband signal processing unit 24 performs demodulation, synchronization, and error correction decoding of the reception signal converted into the digital signal by the radio unit (TRX) 23, multiplexing and de-multiplexing of data, error correction encoding and framing of the transmission signal to be transmitted through the antenna section 21, and baseband signal processing such as data modulation.

The relative change value table 25 stores the relative change value of reception signal intensity notified by the mobile terminal 10, which is obtained from the signal processed by the baseband signal processing unit 24.

The reception signal intensity table 33 stores the reception signal intensity notified by the mobile terminal 10, which is obtained from the signal processed by the baseband signal processing unit 24.

The queue unit 31 includes a plurality of queues 31-1 to 31-n and a priority order is assigned to each queue on the basis of the relative change value of reception signal intensity. In this embodiment, the highest priority is assigned to the queue 31-1, and the lowest priority is assigned to the queue 31-n. It is also controlled that a higher priority is assigned to a handoff request with a weaker reception signal intensity in each of queues 31-1 to 31-n.

The handoff request processing unit 28, when a handoff request is received from the mobile terminal, distributes the handoff request corresponding to the mobile terminal to one of the queues 31-1 to 31-n in the queue unit 31 on the basis of the relative change value of reception signal intensity notified by the mobile terminal which is stored in the relative change value table 25.

The switch 29 specifies one of the queues 31-1 to 31-n in the queue unit 31 to be processed on the basis of the determination result judged by the handoff request processing unit 28.

The queue sequence determination unit 34 determines a processing order of each handoff request waiting in each of queues 31-1 to 31-n on the basis of the reception signal intensity stored in the reception signal intensity table 33. As the reception signal intensity stored in the reception signal intensity table 33 is renewed by each report from the mobile terminal which periodically reporting the measurement result, the queue sequence determination unit 34 also renews the determination result in accordance with the renewal data in the reception signal intensity table 33.

The queue control unit 32 monitors busy/idle state of channels in a cell to be used for the handoff processing, and also monitors the presence of a handoff request in the queues 31-1 to 31-n. If there is a available channel for the handoff request waiting in the queues 31-1 to 31-n, the handoff processing is performed by using the available channel on the basis of the priority order of each of handoff requests.

The control unit (BC-CNT) 27 controls the signal amplification unit (AMP) 22, the radio unit (TRX) 23, the baseband signal processing unit 24, the transmission highway interface unit 26, and the queue control unit 32, and communicates with the upper hierarchy apparatus 50 by transmitting and receiving control signals to perform radio channel management, radio channel establishing and releasing.

The operation of the handoff control system having this arrangement will be described next.

The processing operation of the handoff request processing unit 28 will be described first. In the mobile terminal 10, the reception signal intensity from the base station 20a is periodically measured, and the relative change value of reception signal intensity is notified to the base station 20a at measurement time intervals. The reception signal intensity and the relative change value of reception signal intensity notified to the base station 20a is stored in the reception signal intensity table 33 and the relative change value table 25 in the base station 20a respectively.

In this case, the reception signal intensity and the relative change value of reception signal intensity is also notified from the base station 20a to the base station 20b through the transmission highway interface unit 26 and the network and stored in the reception signal intensity table 33 and the relative change value table 25 in the base station 20b respectively.

The relative change values of reception signal intensity of the mobile terminal are classified into a plurality of classes according to the relative change values, and the queues 31-1 to 31-n corresponding to these classes are provided in the queue unit 31. Among the queues 31-1 to 31-n, the highest priority is assigned to the queue 31-1 for the class corresponding to the largest relative change value of reception signal intensity, whereas the lowest priority is assigned to the queue 31-n for the class corresponding to the smallest relative change value of reception signal intensity.

The reception signal intensity periodically measured in the mobile terminal 10 gradually decreases as moving away from the base station 20a. When the measured reception signal intensity has reached a predetermined handoff threshold level, the mobile terminal 10 sends a handoff request to the base station 20a. The handoff request sent from the mobile terminal 10 to the base station 20a is also notified from the base station 20a to the adjacent base station 20b through the transmission highway interface unit 26 and the network.

Figure 8:
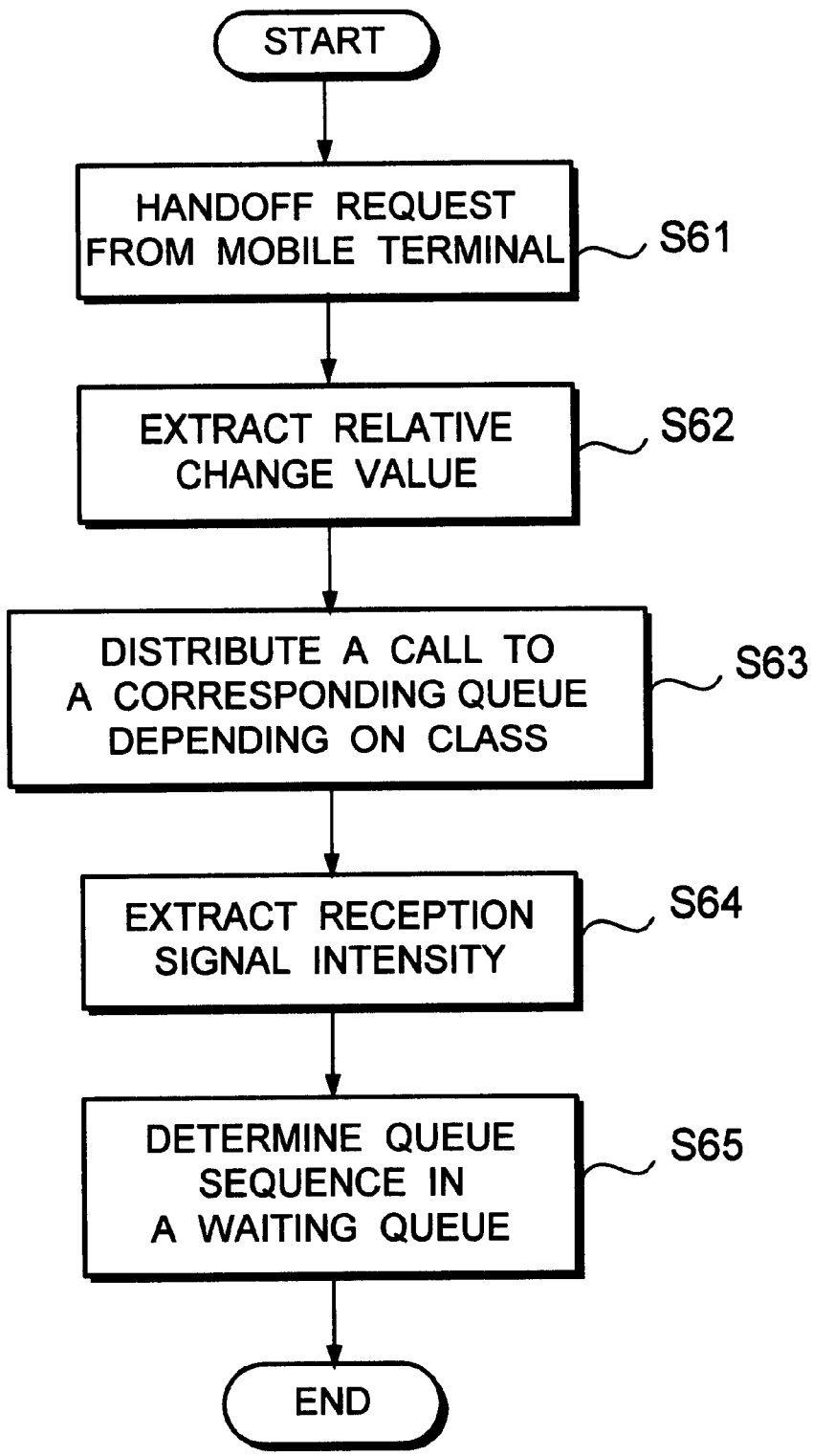
FIG. 8 is a flow chart showing a procedure for processing handoff requests in the handoff control system according to the present invention.
Figure 9:
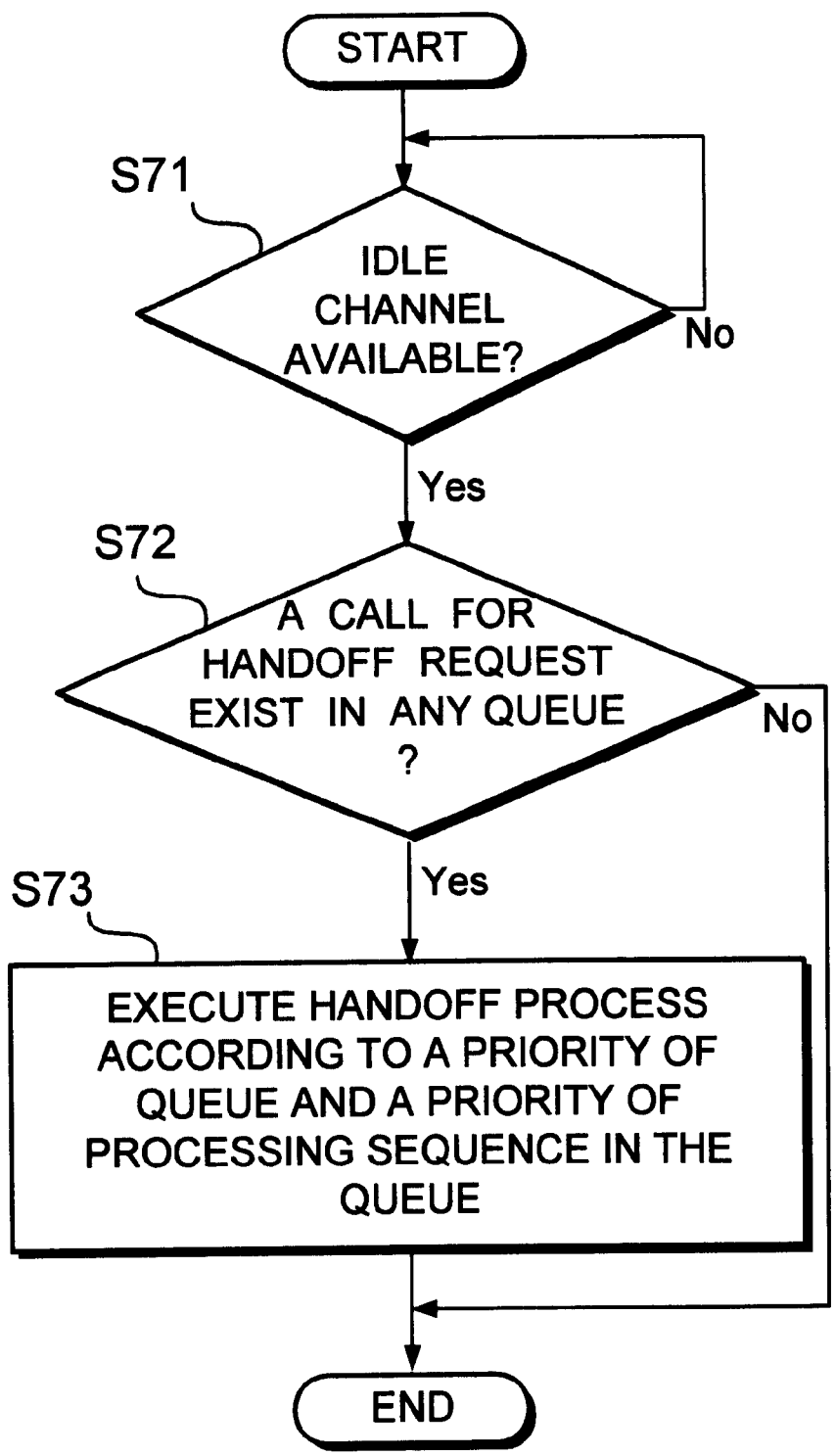
FIG. 9 is a flow chart showing a procedure for queue control in the handoff control system according to the present invention.
Figure 11A:
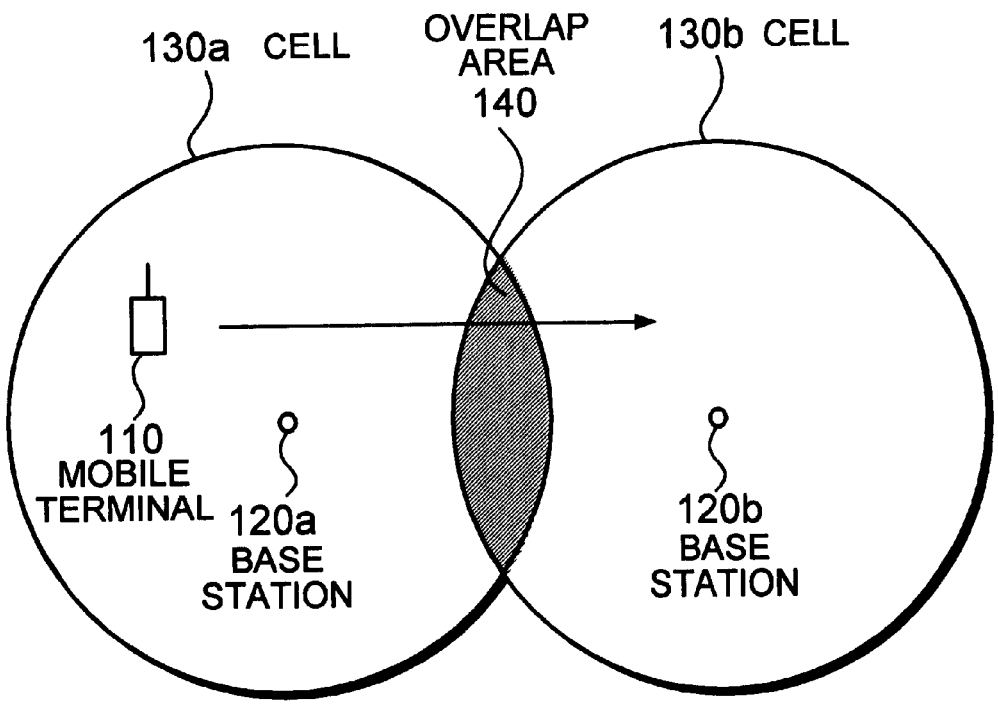
FIG. 11(A) is a schematic view for explaining a handoff control system in a conventional mobile communication system.
Figure 11B:
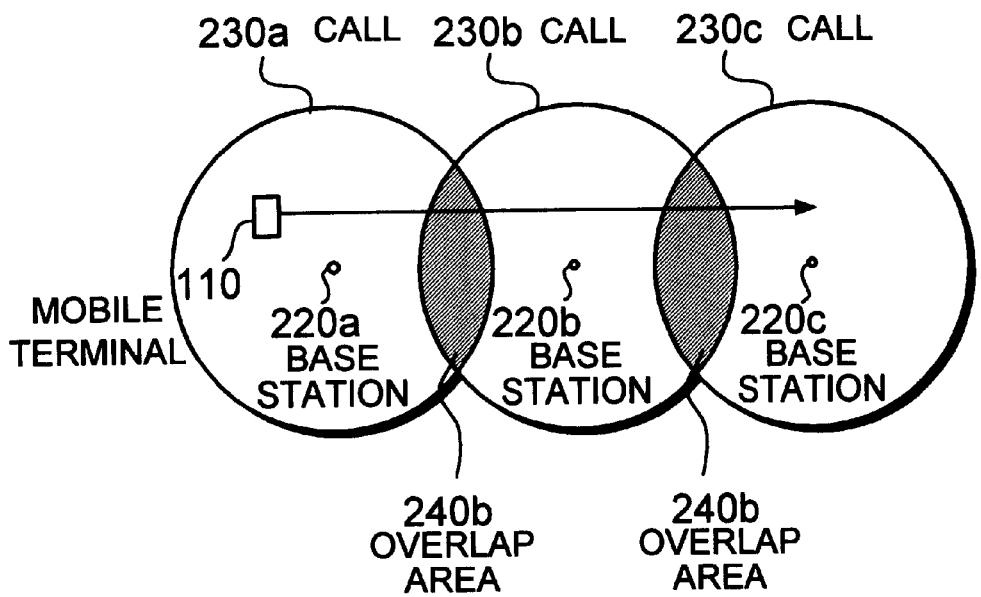
FIG. 11(B) is a view for explaining a case wherein the cell radius in the system in FIG. 11(A) is reduced.

The subsequent operation will be described below with reference to FIGS. 8 and 9.

When a handoff request sent from the mobile terminal 10 is received at the base station 20a (S61), the handoff request is supplied to the handoff request processing unit 28 through the antenna section 21, the signal amplification unit (AMP)

22, the radio unit (TRX) 23, and the baseband signal processing unit 24. With this operation, the handoff request processing unit 28 extracts, from the relative change value table 25, the stored relative change value of reception signal intensity corresponding to the mobile terminal which has sent the handoff request (S62). The handoff request processing unit 28 then controls the switch 29 to distribute a call information for the handoff request to one of the queues 31-1 to 31-n in the queue unit 31 which belongs to the class corresponding to the relative change value of reception signal intensity extracted in step S62 (S63). The queue sequence determination unit 34 extracts, from the reception signal intensity table 33, the stored reception signal intensity corresponding to the mobile terminal which has sent the handoff request (S64). The queue sequence determination unit 34 then determines the processing order of the handoff request distributed in one of the queues 31-1 to 31-n in accordance with the reception signal intensity extracted in step S64 (S65). While waiting for the handoff process, the determination result of the processing order in the queue may be changed whenever the data in the reception signal intensity table 33 is renewed.

Meanwhile, the queue control unit 32 monitors channel state in the cell 30b whether there is an available channel for the handoff processing (S71). If it is determined in step S71 that an idle channel is available, the queue control unit 32 then checks whether there is any handoff request waiting in the queues 31-1 to 31-n in the queue unit 31 (step S72).

When it is found in step S72 that the handoff request waiting for being processed is existing, the queue control unit 32 assigns the available channel in the cell 30b to the handoff request for performing the handoff process in accordance with the priority order assigned to the queue, in which the handoff request is waiting, and also assigned to each of handoff requests in the queue (step S73).

In this case, since priority orders are assigned to the queues 31-1 to 31-n such that the highest priority is assigned to the queue 31-1, and the lowest priority is assigned to the queue 31-n, the handoff request waiting in the queue 31-1 is processed first. Subsequently, the handoff request in the queues 31-2, 31-3, . . . , 31-n are processed in the order named. If a plurality of handoff requests are waiting in the same queue, they are processed in the order of priority determined by the queue sequence determination unit 34. If a plurality of handoff requests having the same priority are waiting in the same queue, they are processed in the order of time sequence at which distributed to the queue by the handoff request processing unit 28.

Assume that a handoff request remains in the queues 31-1 to 31-n without no more report of reception signal intensity nor relative change value of reception signal intensity from the mobile terminal 10. In this case, the queue control unit 32 discards the handoff request from the queue without performing handoff processing, and subsequently, a handoff request having the next higher priority is processed. If the handoff processing cannot be performed within the handoff area for a certain mobile terminal, the queue control unit 32 also discards the handoff request for the mobile terminal, and a handoff request having the next higher priority is processed.

Note that when a new call is generated, normal processing is performed.

As described above, in this embodiment, the relative change value of reception signal intensity measured in the mobile terminal 10 is calculated by the relative change value calculation unit 15 in the mobile terminal 10 and is notified to the base station 20a, together with the reception signal intensity. However, the present invention is not limited to this. Each of the base stations 20a and 20b or the upper hierarchy apparatus 50, such as a base station control apparatus or a mobile switching center, may incorporate a relative change value calculation unit for calculating the relative change value of reception signal intensity by each report of the reception signal intensities from the mobile terminal 10. In this case, the mobile terminal 10 is allowed to report only the reception signal intensity to the base station 20a.

Figure 6:
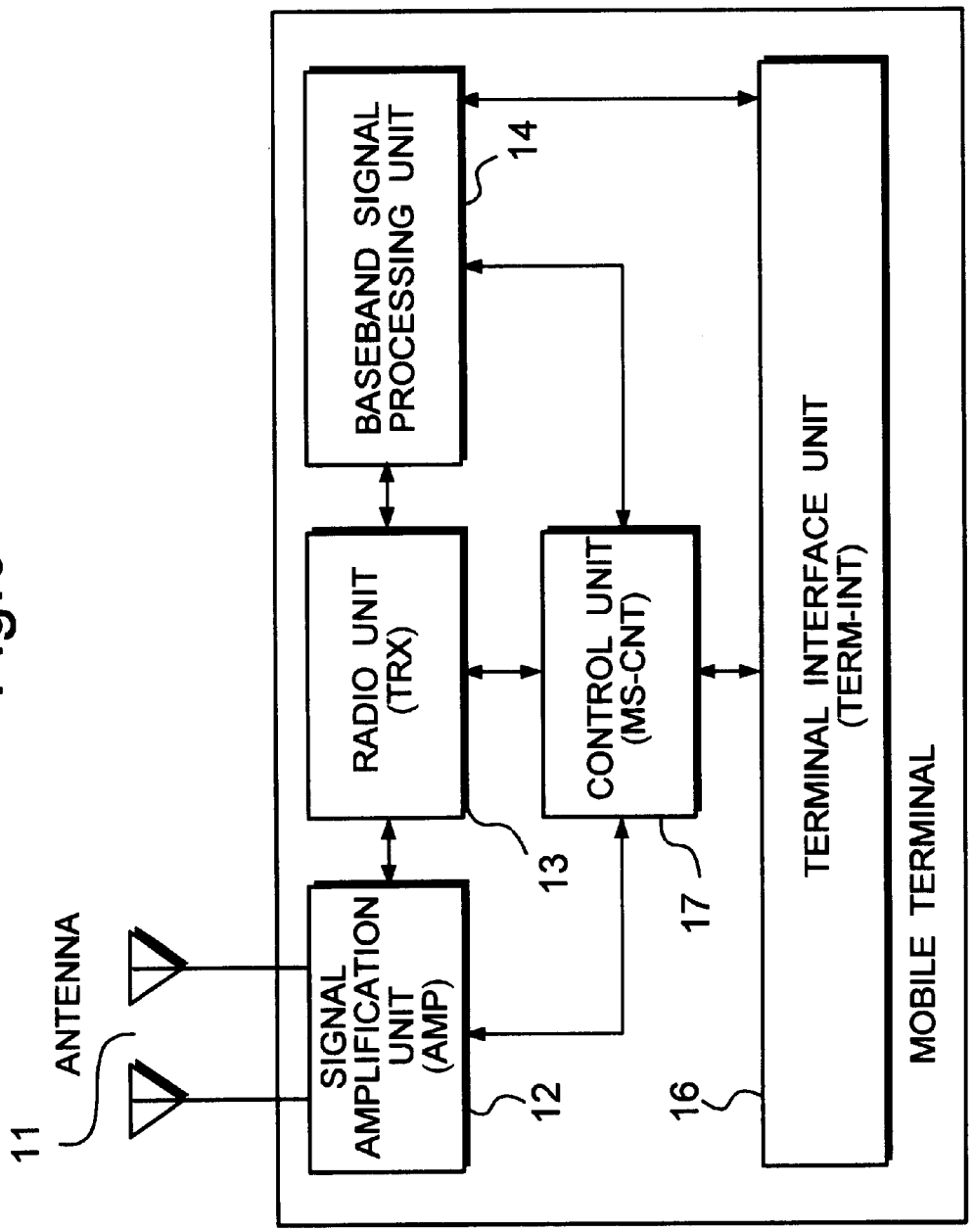
FIG. 6 is a block diagram showing a mobile terminal of the handoff control system according to another embodiment of the present invention.
Figure 7:
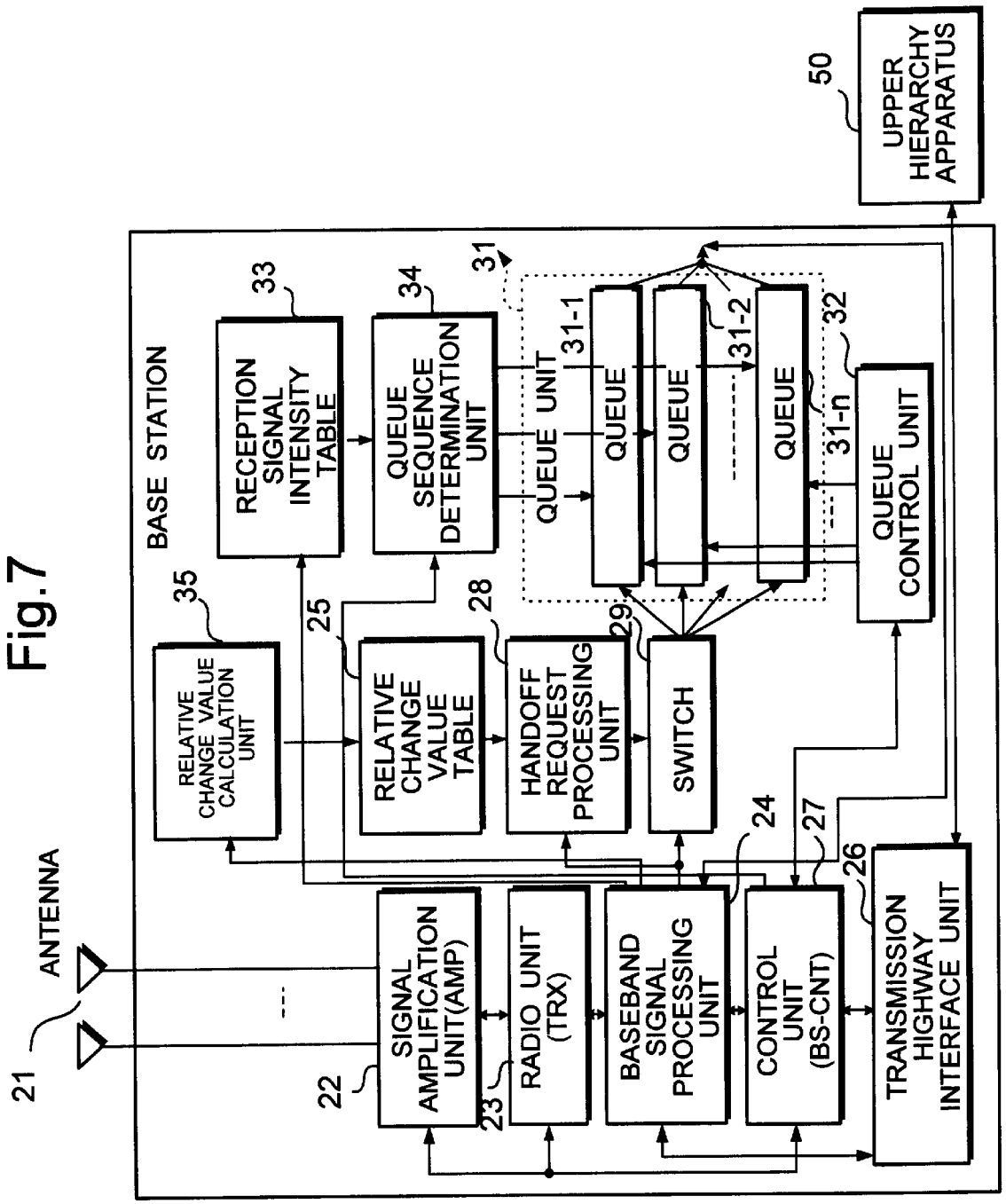
FIG. 7 is a block diagram showing a base station of the handoff control system according to another embodiment of the present invention.

FIG. 6 and FIG. 7 are block diagrams showing a mobile terminal and a base station of the handoff control system according to another embodiment of the present invention.

As shown in FIG. 6, a relative change value calculation unit shown in FIG. 4 is not provided in the mobile terminal. Therefore, in this case, the mobile terminal 10 periodically reports only the reception signal intensity to the base station 20a. Instead of that, a relative change value calculation unit 35 is provided in the base station as shown in FIG. 7. The relative change value calculation unit 35 calculates the relative change value of reception signal intensity by each report of the reception signal intensities from the mobile terminal 10 which is received through the baseband signal processing unit 24. Then, the calculated relative change value of reception signal intensity is stored into the relative change value table 25. This table is renewed by each calculation result, and referred by the handoff request processing unit 28 when the handoff processing is requested. Other processes are the same as those described in the first embodiment above.

In the embodiments described above, the handoff processing is performed in the order based on the moving speeds of mobile terminals. However, since priorities are determined on the basis of the relative change values of reception signal intensity in mobile terminals, the handoff processing may be performed in the order based on the speeds of mobile terminals moving away from the base station, in consideration of the moving routes of the mobile terminals.

FIG. 10 explains control based on the moving routes of mobile terminals in the handoff control system of the present invention.

Assume that the mobile terminal 10a moves straight inside of the cell 30, and the mobile terminal 10b moves in the cell 30 while keeping nearly the same distance from the base station 20, as shown in FIG. 10. Note that the moving speed of the mobile terminal 10a is equal to that of the mobile terminal 10b.

In this case, the reception signal intensity in the mobile terminal 10a changes from a small level to a large level and, then, a large level to a small level depending on a distance from the base station 20, but the reception signal intensity in the mobile terminal 10b remains almost constant. For this reason, when both of the mobile terminals 10a and 10b send a handoff request respectively, the handoff request sent by the mobile terminal 10a giving a larger relative change value of reception signal intensity and it becomes higher in priority than the handoff request sent by the mobile terminal 10b, and is processed first.

The above program for processing handoff control is written in a storage medium such as a ROM (Read Only Memory) and is read out from the storage medium when it is executed.

As has been described above, according to the present invention, a handoff processing for a mobile terminal having measured a larger relative change value of reception signal intensity, which means that the mobile terminal is moving at a higher speed and the time allowed for completing the handoff processing is shorter, can be performed prior to a handoff processing for a mobile terminal having measured a smaller relative change value, which means that the mobile terminal is moving at a slower speed and the time allowed for completing the handoff processing is longer. The time allowed for completing the handoff processing for a mobile terminal moving away from the base station from which service is currently received is shorter than that for a mobile terminal moving while keeping a constant distance from the base station. Therefore, according to the present invention, the probability of forced termination of communication can be reduced at a mobile terminal moving at a high speed and a mobile terminal moving away from the base station from which service is currently received.

What is claimed is:

1. A handoff control system for performing a handoff processing for a mobile terminal that move across cells of a plurality of base stations while performing mobile communication, comprising;
   a mobile terminal which periodically measures a reception signal intensity of a radio signal used for a current communication, calculates a relative change value of reception signal intensity at measurement time intervals, and periodically reports the measured reception signal intensity and the calculated relative change value of reception signal intensity; and
   a base station which periodically receives and stores the reception signal intensity and the relative change value of reception signal intensity respectively reported from said mobile terminal, and performs a handoff processing by giving a higher priority to a handoff request of a mobile terminal for which the stored relative change value of reception signal intensity is larger and the stored reception signal intensity is weaker,
   wherein said base station comprises;
      a memory table which stores data of the reception signal intensity and the relative change value of reception signal intensity in association with each mobile terminal, and renews data in accordance with each periodical report;
      a plurality of queues to which priories based on relative change values of reception signal intensity are assigned in advance;
      a handoff request processing section which distributes a handoff request from each mobile terminal to one of the queues on the basis of the relative change value of reception signal intensity corresponding to the mobile terminal stored in said memory table;
      a queue sequence determination section which determines handoff processing orders for a plurality of handoff requests distributed in the same queue with giving a higher priority to a handoff request for which corresponding reception signal intensity stored in said memory table is weaker; and
      a queue control section which performs a handoff processing for a handoff request having a higher processing order waiting in the queue having a higher priority.

2. A handoff control system for performing a handoff processing for a mobile terminal that moves across cells of a plurality of base stations while performing mobile communication, comprising:
   a mobile terminal comprising;
      a reception signal measuring section which periodically measures a reception signal intensity of a radio signal used for a current communication;
      a relative change value calculating section which calculates a relative change value of reception signal intensity output from said reception signal measuring section at measurement time intervals; and
      a control section which reports the measured reception signal intensity and the calculated relative change value of reception signal intensity periodically to said base station, and outputs a handoff request when the measured reception signal intensity has reached a predetermined handoff threshold level; and
   a base station comprising;
      a memory table which stores data of the reception signal intensity and the relative change value of reception signal intensity in association with each mobile terminal, and renews data in accordance with each periodical report;
      a plurality of queues to which priories based on relative change values of reception signal intensity are assigned in advance;
      a handoff request processing section which distributes a handoff request from each mobile terminal to one of the queues on the basis of the relative change value of reception signal intensity corresponding to the mobile terminal stored in said memory table;
      a queue sequence determination section which determines handoff processing orders for a plurality of handoff requests distributed in the same queue with giving a higher priority to a handoff request for which corresponding reception signal intensity stored in said memory table is weaker; and
      a queue control section which performs a handoff processing for a handoff request having a higher processing order waiting in the queue having a higher priority.

3. A handoff control system for performing a handoff processing for a mobile terminal that moves across cells of a plurality of base stations while performing mobile communication, comprising:
   a mobile terminal which periodically measures a reception signal intensity of a radio signal used for a current communication, and periodically reports the measured reception signal intensity; and
   a base station which periodically receives the reception signal intensity reported from said mobile terminal, calculates a relative change value of reception signal intensity by the reported reception signal intensity at reporting time intervals from said mobile terminal, stores the reception signal intensity and the calculated relative change value of reception signal intensity, and performs a handoff processing by giving a higher priority to a handoff request of a mobile terminal for which the stored relative change value of reception signal intensity is larger and the stored reception signal intensity is weaker,
   wherein said base station comprises;
      a relative change value calculating section which calculates a relative change value of reception signal intensity by the reported reception signal intensity at reporting time intervals from said mobile terminal;
      a memory table which stores data of the reception signal intensity and the relative change value of reception signal intensity in association with each mobile terminal, and renews data in accordance with each periodical report and calculation;
      a plurality of queues to which priories based on relative change values of reception signal intensity are assigned in advance;

a handoff request processing section which distributes a handoff request from each mobile terminal to one of the queues on the basis of the relative change value of reception signal intensity corresponding to the mobile terminal stored n said memory table;

a queue sequence determination section which determines handoff processing orders for a plurality of handoff requests distributed in the same queue with giving a higher priority to a handoff request for which corresponding reception signal intensity stored in said memory table is weaker; and a queue control section which performs a handoff processing for a handoff request having a higher processing order waiting in the queue having a higher priority.

4. A handoff control system for performing a handoff processing for a mobile terminal that moves across cells of a plurality of base stations while performing mobile communication, comprising:

a mobile terminal comprising;

a reception signal measuring section which periodically measures a reception signal intensity of a radio signal used for a current communication: and a control section which reports the measured reception signal intensity and the calculated relative change value of reception signal intensity periodically to said base station under communicating, and outputs a handoff request when the measured reception signal intensity has reached a predetermined handoff threshold level: and a base station comprising:

a relative change value calculating section which calculates a relative change value of reception signal intensity by the reported reception signal intensity at reporting time intervals from said mobile terminal;

a memory table which stores data of the reception signal intensity and the relative change value of reception signal intensity in association with each mobile terminal, and renews data in accordance with each periodical report:

a plurality of queues to which priories based on relative change values of reception signal intensity are assigned in advance:

a handoff request processing section which distributes a handoff request from each mobile terminal to one of the queues on the basis of the relative change value of reception signal intensity corresponding to the mobile terminal stored in said memory table:

a queue sequence determination section which determines handoff processing orders for a plurality of handoff requests distributed in the same queue with giving a higher priority to a handoff request for which corresponding reception signal intensity stored in said memory table is weaker: and a queue control section which performs a handoff processing for a handoff request having a higher processing order waiting in the queue having a higher priority.

5. A method of handoff control for performing a handoff processing for a mobile terminal that moves across cells of a plurality of base stations while performing mobile communication, comprising:

measuring a reception signal intensity of a radio signal used for a current communication periodically at said mobile terminal;

calculating, at said mobile terminal, a relative change value of reception signal intensity by the measured reception signal intensity at measurement time intervals;

reporting the measured reception signal intensity and the calculated relative change value of reception signal intensity periodically from said mobile terminal to said base station under communicating;

storing the reported data of the reception signal intensity and the relative change value of reception signal intensity in association with each mobile terminal into a memory table provided in said base station, and renewing contents of said memory table in accordance with each periodical report by said mobile terminal:

sending a handoff request by said mobile terminal when the measured reception signal intensity has reached a predetermined handoff threshold level;

distributing a handoff request from each mobile terminal to one of plurality of queues provided in said base station, to which priories based on relative change values of reception signal intensity are assigned in advance, on the basis of the relative change value of reception signal intensity corresponding to the mobile terminal stored in said memory table:

determining handoff processing orders for a plurality of handoff requests distributed in the same queue with giving a higher priority to a handoff request for which corresponding reception signal intensity stored in said memory table is weaker: and performing a handoff processing for a handoff request having a higher processing order waiting in the queue having a higher priority.

6. A method of handoff control for performing a handoff processing for a mobile terminal that moves across cells of a plurality of base stations while performing mobile communication, comprising:

measuring a reception signal intensity of a radio signal used for a current communication periodically at said mobile terminal;

reporting the measured reception signal intensity periodically from said mobile terminal to said base station under communicating;

receiving, at said base station, the reception signal intensity, calculating a relative change value of reception signal intensity by the reception signal intensity at reporting time intervals, and storing the reception signal intensity and the relative change value of reception signal intensity respectively in association with said mobile terminal into a memory table provided in said base station, and renewing contents of said memory table in accordance with each periodical report by said mobile terminal;

sending a handoff request by said mobile terminal when the measured reception signal intensity has reached a predetermined handoff threshold level;

distributing a handoff request from each mobile terminal to one of plurality of queues provided in said base station, to which priories based on relative change values of reception signal intensity are assigned in advance, on the basis of the relative change value of reception signal intensity corresponding to the mobile terminal stored in said memory table:

determining handoff processing orders for a plurality of handoff requests distributed in the same queue with giving a higher priority to a handoff request for which corresponding reception signal intensity stored in said memory table is weaker: and performing a handoff processing for a handoff request having a higher processing order waiting in the queue having a higher priority.

* * * * *